United States Patent [19]

Gubler

[11] Patent Number: 4,519,205

[45] Date of Patent: May 28, 1985

[54] DRIVE AND MOUNTING FOR AN OPEN-END SPINNING UNIT

[75] Inventor: Hans-Rudolf Gubler, Gebenstorf, Switzerland

[73] Assignee: BBC Brown, Boveri & Company, Limited, Baden, Switzerland

[21] Appl. No.: 449,999

[22] Filed: Dec. 15, 1982

[30] Foreign Application Priority Data

Dec. 22, 1981 [CH] Switzerland .................. 8195/81

[51] Int. Cl.³ ............................................ D01H 7/882
[52] U.S. Cl. ................................. 57/406; 57/100; 57/404; 384/119; 384/124; 384/230; 384/231
[58] Field of Search ............... 57/100, 77, 130–135, 57/404, 406, 411, 415; 384/119, 124, 125, 215, 230, 231, 235

[56] References Cited

U.S. PATENT DOCUMENTS

| 3,105,164 | 9/1963 | Favrot | 57/100 X |
|---|---|---|---|
| 3,241,304 | 3/1966 | Mattingly et al. | 57/100 X |
| 3,416,300 | 12/1968 | Schenkel | 57/100 X |
| 3,875,732 | 4/1975 | Ellingham | 57/406 |
| 3,918,248 | 11/1975 | Suzuki | 57/415 X |
| 3,924,398 | 12/1975 | Esser et al. | 57/406 X |
| 4,022,008 | 5/1977 | Pimiskern et al. | 57/134 X |
| 4,070,813 | 1/1978 | Quandt et al. | 57/100 X |
| 4,112,663 | 9/1978 | Chrtek et al. | 57/100 X |
| 4,242,858 | 1/1981 | Dschen | 57/100 X |
| 4,306,166 | 12/1981 | Quandt | 57/100 X |

FOREIGN PATENT DOCUMENTS 598503  4/1978  Switzerland .

Primary Examiner—John Petrakes
Attorney, Agent, or Firm—Oblon, Fisher, Spivak, McClelland & Maier

[57] ABSTRACT

So as to be able to achieve, in yarn manufacture, the very high speed required by the textile industry in open-end spinning devices, for the purpose of increasing production, the rotors which are connected to the spinning container including a spinning groove, are designed as a hollow shaft, and this hollow shaft is guided radially on a bearing journal located in the interior of the hollow shaft by means of gas-dynamic radial plain bearings designed as inner bearings. Gas-dynamic axial plain bearings are provided for the axial guidance of the rotor rotating at very high speed. The rotor together with the spinning container can be pushed in and out in a simple way from the spinning side, and to position the rotor over the entire speed range, permanent magnets are located in the bearing journal opposite the rearside of the spinning container and in an annular widened portion of the bearing journal.

11 Claims, 1 Drawing Figure

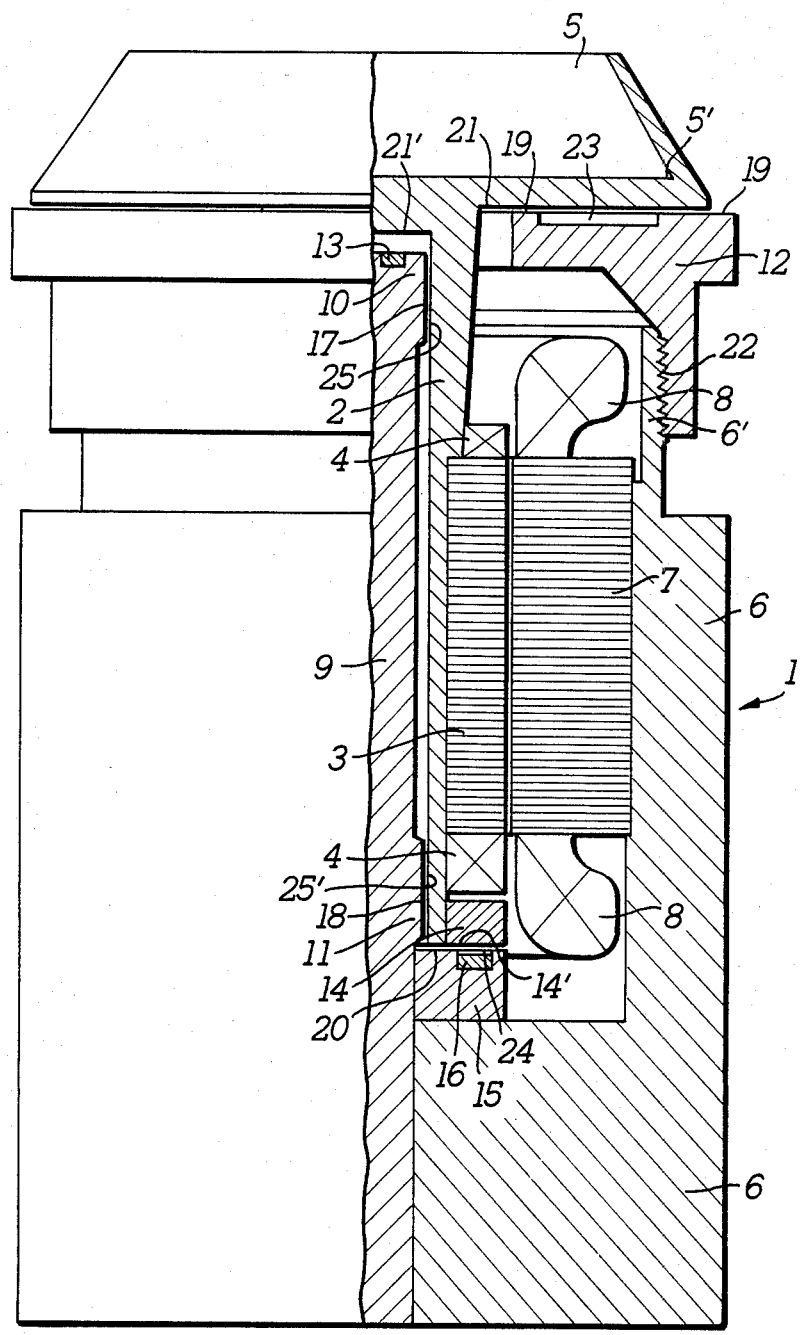

DRIVE AND MOUNTING FOR AN OPEN-END SPINNING UNIT

BACKGROUND OF THE INVENTION

1. Field of the Invention

The invention relates to an open-end spinning device consisting of an electric motor with a housing and a laminated stator, as well as with a rotor the laminations and winding of which are arranged on a hollow shaft. A spinning container is located on the hollow shaft. A device of this type is known, for example, from Swiss Patent Specification 598,503.

2. Description of the Prior Art

The requirements demanded of textile machines working according to the open-end spinning process are as follows:

1. a high production capacity per machine unit;
2. a long life;
3. short idle time;
4. long inspection intervals;
5. a low noise level;
6. a high degree of flexibility for a wide yarn-count range.

However, these requirements can be met only with machine constructions which essentially allow fault-free spinning at very high speeds and rapid exchangeability of the spinning containers with different dimensions, whilst ensuring minimum idle times. The necessary robustness of construction and the necessary quiet running of the rotors at high speeds, which involve the mounting of the rotors, are important preconditions for this.

Swiss Patent Specification 598,503 describes a spinning unit of the type mentioned above. In this, the rotor shaft forms with the rotor of the electric motor, together with roller bearings, a unit which is fixed in the housing of the machine by means of gluing and, if appropriate, by means of additional mechanical tongue-and-groove anchoring.

However, the use of roller bearings for high rotor speeds presents problems, since these can lead to losses due to friction which are converted into heat and can transmit this heat to the rotor and spinning container. Although the construction according to Swiss Patent Specification 598,503 provides for the exchangeability of the rotor part in textile operation, this specification does not describe the method of putting this into effect. However, it would seem to involve a relatively high outlay in terms of work and time.

SUMMARY OF THE INVENTION

Starting from the state of the art described above, the object on which the invention is based is to provide an open-end spinning device which works in an operationally reliable manner in a very high speed range and in which the rotor together with the spinning container can be exchanged in a simple way and/or different spinning-container sizes can be interchanged as desired. To achieve this object, it is envisaged, according to the invention, that there be located in the interior of the hollow shaft a bearing journal which guides the rotor, together with the winding and the spinning container, at least in the radial direction, this bearing journal being connected firmly to the housing of the motor. This construction has the following advantages.

1. The angular momentum is transmitted electromagnetically, without significant losses, to the rotating mass of the rotor. The low friction of the mounting results, even at high speeds, in a reduced power consumption of the electric motor;

2. this advantage is further reinforced because the mounting of the rotor can be provided at locations which are preferred in terms of the dynamics of the shaft and which are the most appropriate for the particular use;

3. because the rotor mounting is shifted from the outside of the shaft to the inside of the shaft, the rotor is decoupled thermally from the bearing. In particular, reactions from the rotor which heat up as a result of electromagnetic influences and frictional forces are eliminated as a result;

4. the static part of the rotor mounting is vibrationally designed in such a way that the rotor is guided in a stable manner within a very high speed range.

The hollow shaft and the spinning container are made in one piece or are connected firmly to one another. As a result, a high dynamic rigidity of the rotor together with the spinning container is achieved.

The rotor together with the spinning container can be pushed into and out of the stator bore from the spinning container side. The advantage of this embodiment is that, by means of this arrangement of the rotor and stator parts, the rotor can be exchanged in a simple way, without releasing mechanical connections, and/or different spinning-container sizes can be interchanged as desired.

The bearing journal extends up to the end of the hollow shaft on the same side as the spinning container.

There is a first gas-dynamic radial bearing on the portion of the hollow shaft on the same side as the spinning container and there is a second gas-dynamic radial bearing at the opposite end of the hollow shaft.

The advantage of the above features is that the rotor together with the spinning container is guided radially in a stable manner at very high speeds.

The housing is provided with a front cover which is designed as a bearing plate for a gas-dynamic axial bearing.

The bearing journal is provided with at least one annular widened portion which serves for receiving a further gas-dynamic axial bearing.

The advantage according to these latter features is that the rotor together with the spinning container are guided axially in a stable manner at very high speeds.

Means for generating a restoring force for the rotor are provided in the stator part. The means are permanent magnets which have an annular design.

At least one permanent magnet is provided in the end of the bearing journal located opposite the rear side of the spinning container.

At least one permanent magnet is provided in the annular widened portion of the bearing journal.

The advantage of these last features is that the rotor together with the spinning container is positioned exactly in every speed range.

Excess air pressure is generated in the gaps between the radial and axial functional surfaces of the bearing and the functional surfaces of the bearing journal and the rear side of the spinning container, and the rotor is guided gas-dynamically without contact.

By means of this measure, inadmissible heating of the rotor during continuous operation at very high speeds of the drive and working unit is prevented, and a high degree of quiet running of the rotor at high speeds is achieved. By means of this dynamic radial and axial bearing suspension of the rotor, the mass of the rotor, rotating with a slight imbalance, is guided in a stable manner at very high speeds.

The opposite surfaces of the rear side of the spinning container and the end face of the bearing plate have similar contours so as to seal off the rotor.

The bearing plate extends up to the hollow shaft, and the remaining bore in the bearing plate has a diameter corresponding to the outside diameter of the rotor.

By means of these sealing-off measures, the rotor is shielded from the surrounding air. As a result, the losses due to air friction caused by the rotor are greatly reduced.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views and wherein:

The sole FIGURE shows a view of an open-end spinning motor, the right-hand half being shown as an axial section.

DETAILED DESCRIPTION OF THE PREFERRED EMBODIMENT

The spinning device consists basically of an electric motor 1 with a stator 7 and a rotor 3 together with a spinning container 5. The laminated stator 7, including the winding, of which only the winding ends 8 are evident in the drawing, are located in the bore of housing 6. In the solid lower part of the housing 6 there is positioned, in the center of the machine, the bearing journal 9 which is connected firmly to the housing 6. The rotor 3 consists of a hollow shaft 2 which is intergrally formed with or fixed to a spinning container 5. The spinning groove 5' is evident in the spinning container 5. The laminated rotor 3 and the rotor winding 4 are also arranged on the hollow shaft 2. Two gas-dynamic radial plain bearings 10, 11 and two gas-dynamic axial plain bearings 19 and 20 are provided for mounting the hollow shaft 2 including all the rotating parts 3, 4, 5 which rotate at high speed.

The Forschungsvereinigung Verbrennungskraftmaschinen e.V. published in number R 298, 1976, a lecture by Professor J. Glienicke of the University of Karlsruhe, which was given in Munich on 16.9.1976 on the occasion of the Information Conference of the Forschungvereinigung Verbrennungsckraftmachinen e.V., describes the theoretical and experimental analyses of the gas-dynamic bearings for small turbo-machines on which the invention is based.

The first radial bearing 10 is located in the portion of the hollow shaft 2 on the same axial end as the spinning container, and the second radial bearing 11 is located at the opposite end of the hollow shaft 2. The first axial bearing 19 having a pocket 23 is provided in the end face of the bearing plate 10. A Portion 1 of this bearing is connected to the housing part 6' by means of a screw thread 22 or is fixed thereto, and consists of the working surface and the axial-bearing pocket 23. A second axial bearing 20 having a pocket 24 is located at the annular widened portion 15 of the bearing journal 9 and includes the working surface and the axial-bearing pocket. Since the rotor together with the spinning container 5 can be pushed into and out of the stator bore from the spinning container side in a simple way and is not mechanically axially locked, the positioning of the rotor in the stator assumes increased importance. The rotor is positioned exactly for every speed range by means of permanent magnets 13, 16. One of these magnets is positioned in the end of the bearing journal 9 located facing the rear side 21' of the spinning container and the other magnet is positioned in the annular widened portion 15 of the bearing journal 9. The permanent magnet 13 located at the end of the bearing journal 9 exerts a magnetic pull on the opposing rearside 21' of the spinning container and presses the rotor surface 21 of the spinning container against the surface of the first axial bearing 19, 23. Likewise, the permanent magnet 16 located in the annular widened portion 15 exerts a magnetic pull on the opposite balancing ring 14 and presses the lower face 14' of the balancing ring 14 of the rotor against the working surface of the second axial bearing 20.

In this way, the rotor together with the spinning container 5 are retained in a precisely defined position in the stator for every speed range.

The balancing ring 14 located at the end of the hollow shaft 2 facing away from the spinning container serves, in addition to the function of axial mounting of the rotor, also for compensating any possible slight imbalance of the rotor 3 occurring at very high speeds. When the machine is at a standstill, the working surfaces of the first axial bearing 19 and the working surfaces of the second axial bearing 20 are in mutual contact. Likewise, when the machine is at a standstill, the working surfaces 17, 18 of the first radial bearing 10 and of the second radial bearing 11 can touch the opposite working surfaces 25, 25' of the bearing journal 9. However, even at a low speed of the rotor, a build-up of pressure takes place both in the two axial bearings 19 and 20 and in the two radial bearings 10, 11, and a gap forms automatically, on the one hand, between the working surfaces of the first axial bearing 19 and the working surfaces of the second axial bearing 20 and, on the other hand, between the working surfaces 17, 25 of the first radial bearing 10 and the working surfaces 18, 25' of the second radial bearing 11.

Of course, the mounting of the hollow shaft 2 together with the rotating parts 3, 4, 5 is not restricted only to gas-dynamic radial plain bearings 10, 11 and axial plain bearings 19 and 20. Furthermore, gas-static, hydrodynamic and hydrostatic plain bearings and roller bearings of various types can likewise be used within the scope of the present invention. The choice of mounting depends primarily on the rotor speed.

Obviously, numerous modifications and variations of the present invention are possible in light of the above teachings. It is therefore to be understood that within the scope of the appended claims, the invention may be practied otherwise than as specifically decribed herein.

What is claimed as new and described to be secured by Letters Patent of the United States is:

1. An open end spinning device, comprising:
   a spinning container;
   an electric motor housing having a bore and on which said container is mounted;
   a laminated stator mounted in said bore of said housing;
   a laminated rotor mounted within said stator, said rotor being mounted on a hollow shaft closed at an end nearest said spinning container, said hollow shaft having a first and second working surface at open and closed ends thereof, respectively, and wherein said rotor includes a rotor winding;

a spinning container located on one end of said hollow shaft and connected to said rotor; and radial bearing journal means in said hollow shaft for radially guiding the rotation of said rotor, said radial journal means being fixed to said housing and extending the length of said bore;

wherein said radial journal means further comprises a first gas dynamic radial bearing located at the spinning container side thereof and having a working surface engageable with said first working surface of said hollow shaft and a second gas dynamic radial bearing having a working surface engageable with said second working surface of said hollow shaft and wherein said container, said hollow shaft, said rotor and said rotor winding are removable as a unit from said bore.

2. The device of claim 1 including a cover on said first end of said housing, said cover and said container including opposing surfaces which together define a first gas-dynamic axial bearing.

3. The device of claim 2 wherein said device includes an annular radial protrusion for said first end of said radial journal means, said protrusion and said hollow shaft having opposing surfaces which together define said second gas dynamic axial bearing.

4. The device of claim 3 including means for applying an axial restoring force, said means for applying an axial restoring force being positioned in said journal.

5. The device of claim 4 wherein said means for applying an axial restoring force comprise permanent magnets.

6. The device of claim 5 wherein one of said permanent magnets is mounted on a surface of said journal facing a surface of said container.

7. The device of claim 6 wherein a second of said permanent magnets is mounted on a surface of said annular protrusion facing said hollow shaft.

8. The device of claim 4 wherein a second of said permanent magnets is mounted on a surface of said annular protrusion facing said hollow shaft.

9. The device of claim 2 wherein said opposing surfaces of said cover and said container have complementary shapes so as to seal the interior of said housing.

10. The device of claim 1 wherein said device includes an annular radial protrusion for said first end of said radial journal means, said protrusion and said hollow shaft having opposing surfaces which together define said second gas dynamic axial bearing.

11. The device of claim 10 including means for applying an axial restoring force, said means for applying an axial restoring force being positioned in said journal.

* * * * *